US008993154B2

(12) United States Patent
Favaretto

(10) Patent No.: US 8,993,154 B2
(45) Date of Patent: Mar. 31, 2015

(54) STORAGE SYSTEM FOR THE STORAGE OF ELECTRIC ENERGY FOR A VEHICLE WITH ELECTRIC PROPULSION

(75) Inventor: Fabrizio Favaretto, Formigine (IT)

(73) Assignee: Ferrari S.p.A. (IT)

( * ) Notice: Subject to any disclaimer, the term of this patent is extended or adjusted under 35 U.S.C. 154(b) by 0 days.

(21) Appl. No.: 13/349,227

(22) Filed: Jan. 12, 2012

(65) Prior Publication Data

US 2013/0078498 A1 Mar. 28, 2013

(30) Foreign Application Priority Data

Jan. 13, 2011 (IT) .............................. BO2011A0008

(51) Int. Cl.

| | |
|---|---|
| ***H01M 2/30*** | (2006.01) |
| ***H01M 2/20*** | (2006.01) |
| ***B60K 1/04*** | (2006.01) |
| ***B60K 6/48*** | (2007.10) |
| ***B60L 11/18*** | (2006.01) |

(52) U.S. Cl.

CPC ................. *H01M 2/202* (2013.01); *B60K 1/04* (2013.01); *H01M 2/206* (2013.01); *B60K 6/48* (2013.01); *B60L 11/1877* (2013.01); *B60L 11/1879* (2013.01); *B60K 2001/0438* (2013.01); *Y02T 10/6221* (2013.01); *Y02T 10/7005* (2013.01); *Y02T 10/7055* (2013.01)

USPC ............. 429/179; 429/158; 429/159; 429/99; 429/178; 429/82

(58) Field of Classification Search

USPC ...................... 429/158, 159, 179, 99, 82, 178

See application file for complete search history.

(56) References Cited

U.S. PATENT DOCUMENTS

| | | | | |
|---|---|---|---|---|
| 7,479,346 | B1 | 1/2009 | Chow et al. | |
| 2011/0014512 | A1* | 1/2011 | Amagai et al. | 429/159 |

FOREIGN PATENT DOCUMENTS

| | | | |
|---|---|---|---|
| EP | 2199133 | A2 | 6/2010 |
| WO | WO-2008/050953 | A1 | 5/2008 |
| WO | WO 2009107657 | * | 9/2009 |
| WO | WO 2010/019503 | A2 * | 2/2010 |

OTHER PUBLICATIONS

"Italian Application Serial No. IT B020110008, Search Report completed Aug. 9, 2011", 2 pgs.

* cited by examiner

*Primary Examiner* — Stewart Fraser
*Assistant Examiner* — Olatunji Godo
(74) *Attorney, Agent, or Firm* — Schwegman Lundberg & Woessner, P.A.

(57) ABSTRACT

A storage system for the storage of electric energy for a vehicle with electric propulsion; the storage system has: a plurality of chemical batteries, which are divided into groups, each of which comprises chemical batteries connected to each other in series and/or in parallel; and two rigid busbars, which connect the groups of chemical batteries in parallel and have respective connection portions, which constitute the connection terminals of the storage system to the outside; each rigid busbar has a variable cross section, which increases close to the connection portion, so that the cross section of each busbar is the largest at the connection portion and the smallest in correspondence to the end which lies the farthest from the connection portion.

10 Claims, 3 Drawing Sheets

STORAGE SYSTEM FOR THE STORAGE OF ELECTRIC ENERGY FOR A VEHICLE WITH ELECTRIC PROPULSION

PRIORITY CLAIM AND RELATED APPLICATIONS

This application claims the benefit of priority under 35 U.S.C. Section 119 to Italian Patent Application Serial No. BO2011A 000008, filed on Jan. 13, 2011, which application is incorporated herein by reference in its entirety.

TECHNICAL FIELD

The present invention relates to a storage system for the storage of electric energy for a vehicle with electric propulsion.

The present invention is advantageously applied to a road vehicle with hybrid propulsion, to which explicit reference will be made in the following description without therefore of loosing in generality.

BACKGROUND

A hybrid vehicle comprises an internal combustion thermal engine, which transmits torque to the drive wheels by means of a transmission provided with a gearbox, and at least one electric machine which is electrically connected to a storage system for the storage of electric energy and mechanically connected to the drive wheels.

The storage system for the storage of electric energy comprises a plurality of electrochemical batteries which are connected in series and in parallel. The most important feature of the storage system for the storage of electric energy for a hybrid vehicle is the weight/performance ratio, because the storage system must ideally provide high electric performance (typically the electric energy stored as a whole and the maximum deliverable electric power) being at the same time very light (and thus not very large).

SUMMARY

Various embodiments provide a storage system for the storage of electric energy for a vehicle with electric propulsion, which storage system allows to optimize the weight/performance ratio and is, at the same time, easy and cost-effective to make.

In various embodiments, a storage system for the storage of electric energy for a vehicle with electric propulsion is made as disclosed in the appended claims.

BRIEF DESCRIPTION OF THE DRAWINGS

The present invention will now be described with reference to the accompanying drawings, which illustrate some non-limitative embodiments thereof, in which.

DETAILED DESCRIPTION

Figure 1:
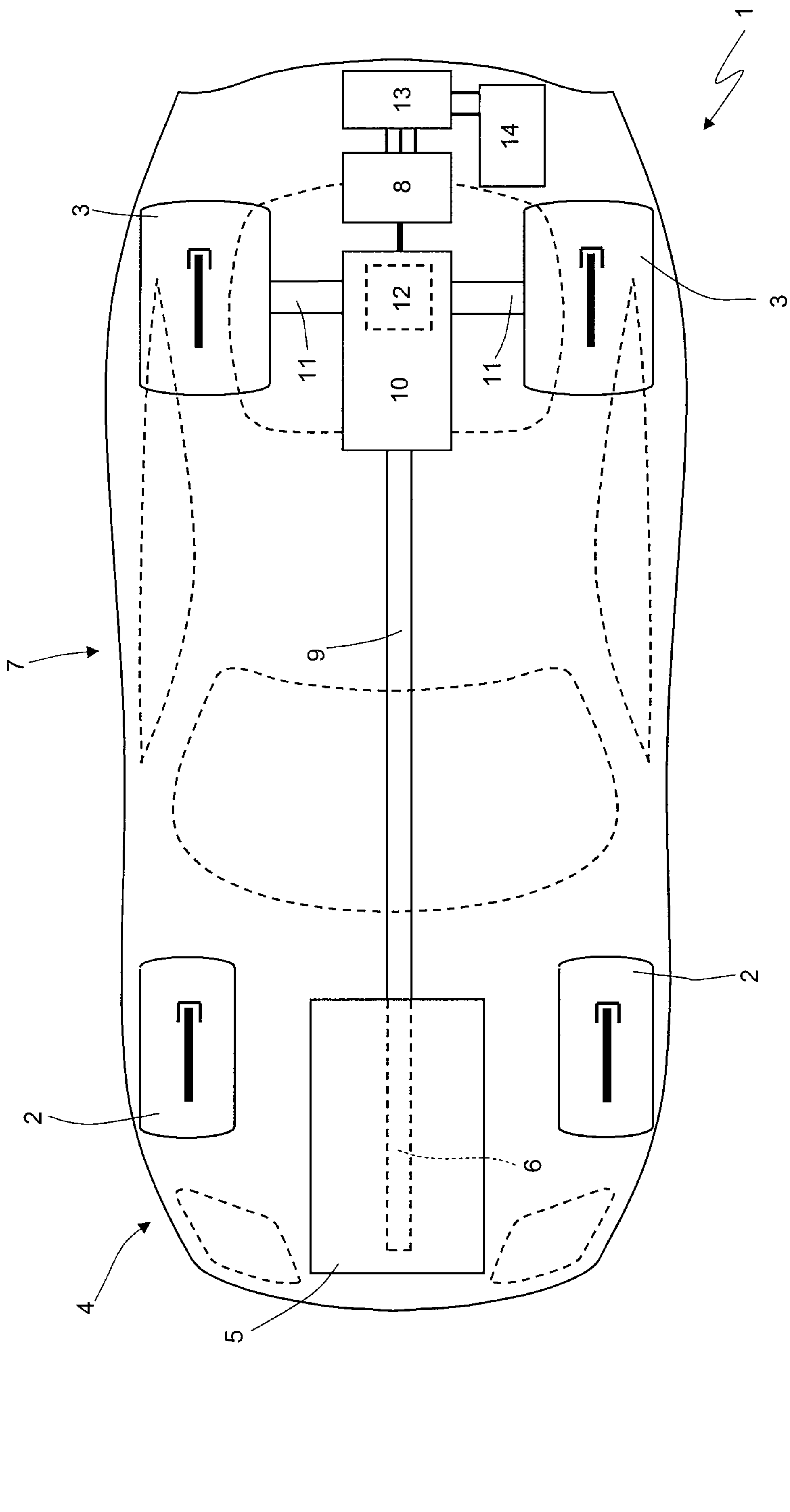
FIG. 1 is a diagrammatic, plan view of a road vehicle with hybrid propulsion.

In FIG. 1, numeral 1 indicates as a whole a road vehicle with hybrid propulsion provided with two front wheels 2 and two rear drive wheels 3, which receive torque from a hybrid propulsion system 4.

The hybrid propulsion system 4 comprises an internal combustion engine 5, which is arranged in frontal position and is provided with a drive shaft 6, an automatic manual transmission 7 (commonly named "AMT"), which transmits the torque generated by the internal combustion engine 5 to the rear drive wheels 3, and a reversible electric machine 8 (i.e. an electric machine which can work either as electric motor, using electric energy and generating mechanical torque, or as an electric generator, using mechanical energy and generating electric energy), which is mechanically connected to the transmission 7.

The transmission 7 comprises a transmission shaft 9, which on one end is angularly integral with the drive shaft 6, and on the other end is mechanically connected to a twin-clutch gearbox 10, which is arranged in rear position and transmits motion to the rear drive wheels 3 by means of two axles shafts 12, which receive motion from a differential 12. The main electric machine 8 is mechanically connected to the gearbox 10 and, in particular, is angularly integral to a primary shaft of the gearbox 10; for the connection methods of the main electric machine 8 to the twin-clutch gearbox 10 reference is made, for example, to the description in patent application IT2009BO00752, which is incorporated herein by reference in it entirety.

Figure 2:
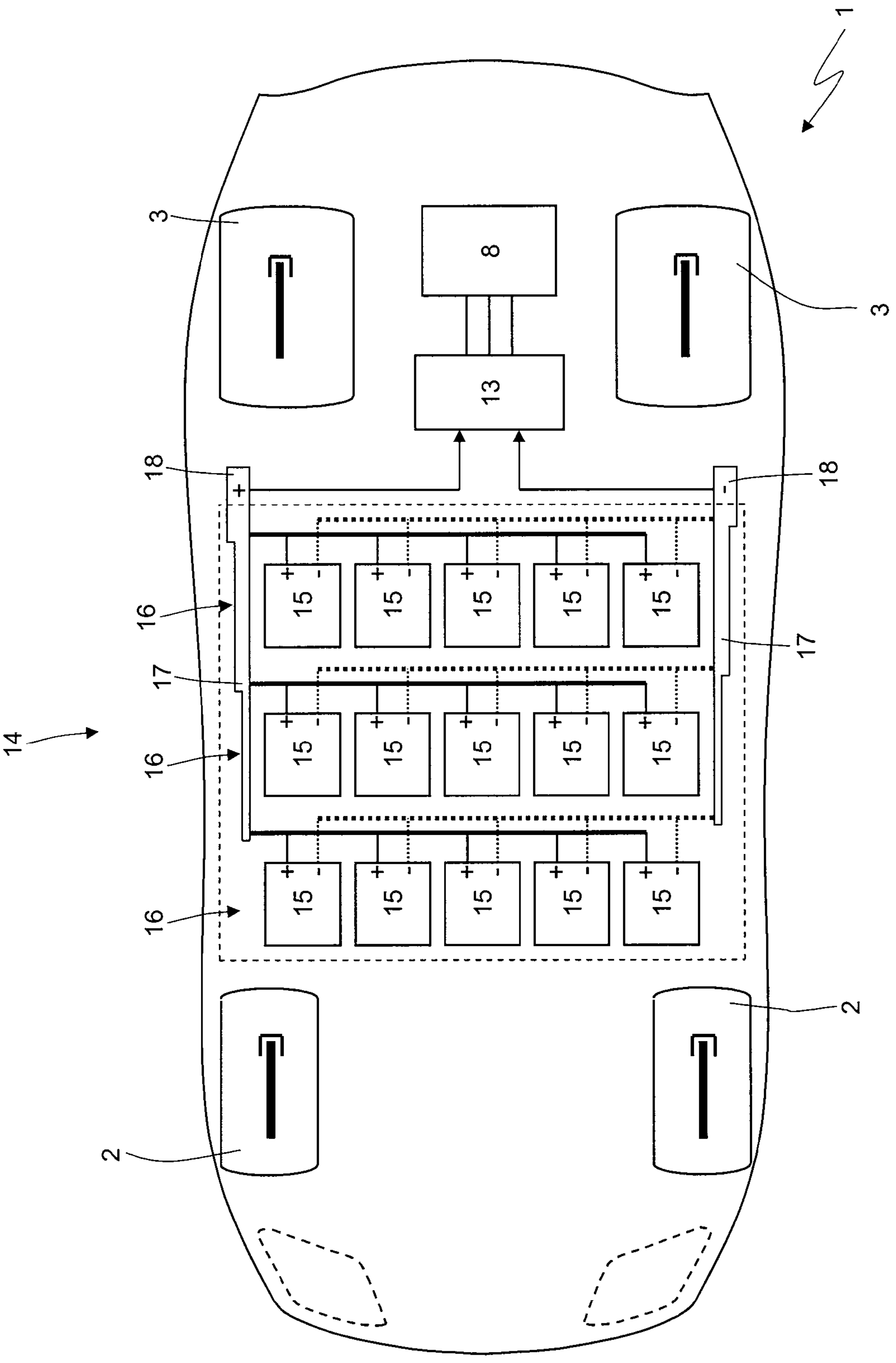
FIG. 2 is a diagrammatic view of a storage system for the storage of electric energy of the road vehicle in FIG. 1, made in accordance with the present subject matter.

The electric machine 8 is driven by a two-way electronic power converter 13 which is connected to a storage system 14 for the storage of electric energy. As shown in FIG. 2, the storage system 14 for the storage of electric energy comprises a plurality of chemical batteries 15 connected to each other in series and/or in parallel. Each chemical battery 15 consists of a series of electrochemical cells which are used to convert the storage chemical energy into electric energy or vice versa, and which are normally connected to each other in series so that the voltage of the single cells is added up.

Figure 3:
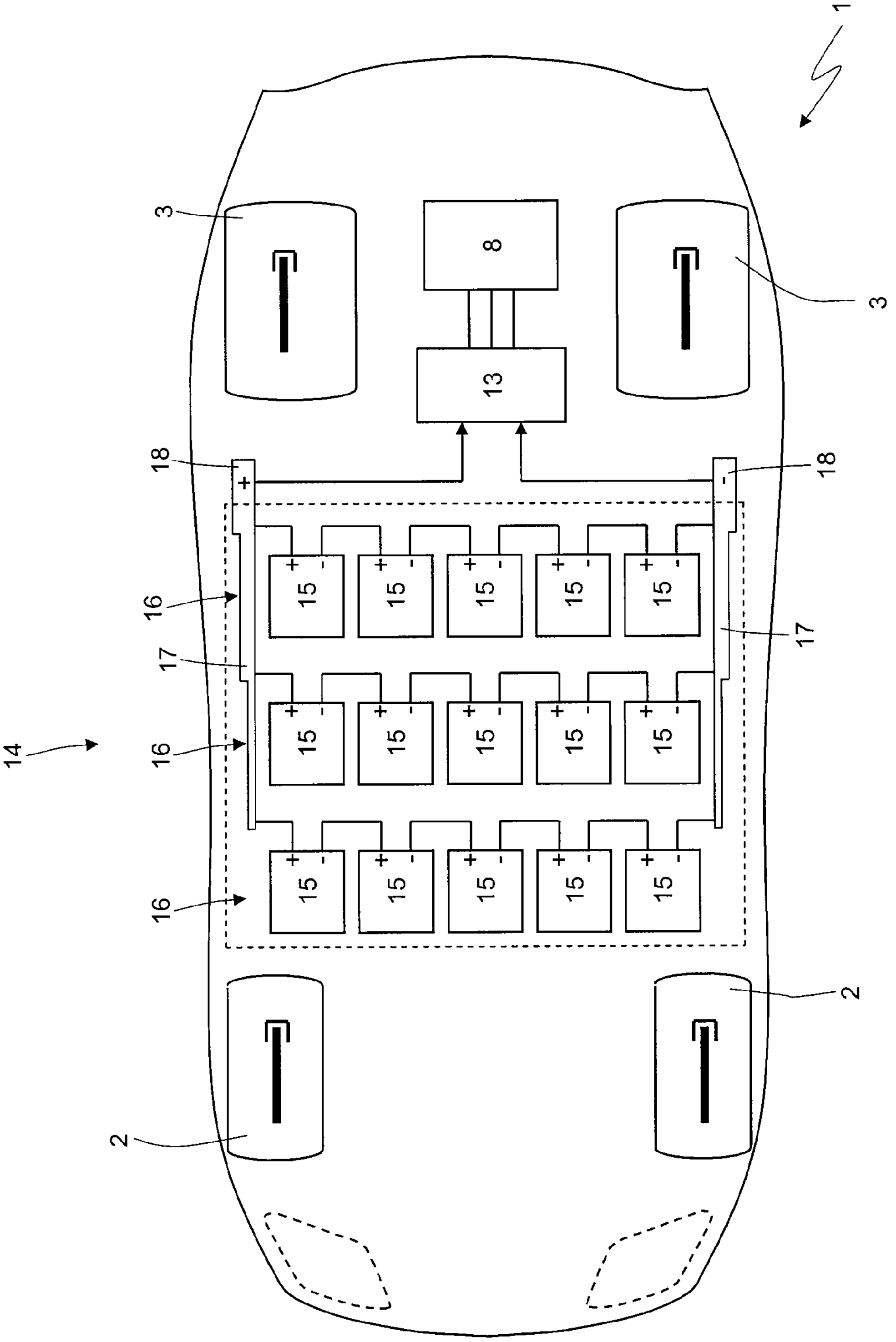
FIG. 3 is a diagrammatic view of an alternative embodiment of the storage system for the storage of electric energy in FIG. 2.

As shown in FIG. 2, the chemical batteries 15 of the storage system 14 for the storage of electric energy are divided into groups 16. In the embodiments shown in the accompanying figures, three groups 16 are provided, each of which comprises five chemical batteries 15 (obviously, these numbers are only an example of non limitative embodiment). In the embodiment shown in FIG. 2, in each group 16, the chemical batteries 15 are connected in parallel; instead, in the embodiment shown in FIG. 3, in each group 16 the chemical batteries are connected in series.

The storage system 14 for the storage of electric energy comprises two rigid busbars 17, which connect the groups 16 of chemical batteries 15 in parallel and have respective connection portions 18, which constitute the connection terminals of the storage system 14 to the outside; in the embodiment shown in the accompanying figures, the connection portion 18 of each rigid busbar 17 coincides with an end of the rigid busbar 17.

Each rigid busbar 17 has a variable cross section, which increases close to the connection portion 18, so that the cross section of each busbar 17 is the largest at the connection portion 18 and the smallest at the end which lies the farthest from the connection portion 18. In the embodiment shown in the accompanying figures, each rigid busbar 17 has a stepped variable cross section, which increases upstream and in proximity to the connection point of each group 16 of chemical batteries 15. In particular, upstream and in proximity to the insertion point of each group 16 of chemical batteries 15 the cross section of each rigid busbar 17 increases in steps by a same quantity.

A possible criterion for determining the section of each rigid busbar 17 in each point is to maintain constant the maximum electric current density (typically measured in Ampere/mm2) across the rigid busbar 17 itself; according to this criterion, after having fixed the maximum required current density, the section of each rigid busbar 17 increases in steps and in proximity to the insertion point of a group 16 of chemical batteries 15 by a quantity equal to the maximum electric current which can be delivered by the group 16 of chemical batteries 15 divided by the maximum desired electric current density.

According to an embodiment, the chemical batteries 15 of the storage system 14 for the storage of electric energy are arranged directly in contact with a floorpan of a passenger compartment of a road vehicle 1. The floorpan is fixed to a chassis of a road vehicle 1, constitutes a bottom wall of the passenger compartment and generally consists of a single sheet or two sheets superimposed at a given distance to define a box-like body. The possible arrangements of the chemical batteries 15 of the storage system 14 for the storage of electric energy on the floorpan are described, for example, in patent application EP2199133A1, which is incorporated herein by reference in its entirety.

The above-described storage system 14 for the storage of electric energy has many advantages.

Firstly, the storage system 14 for the storage of electric energy is simple and cost-effective to make.

Furthermore, the storage system 14 for the storage of electric energy described above allows to reduce to the minimum necessary the overall weight of the rigid busbars 17 by virtue of the "step" shape. With respect to busbars 17 of constant section, the weight of the "step"-like rigid busbars 17 made be reduced by as much as 50%.

The storage system 14 for the storage of electric energy described above having variable cross section rigid busbars 17 is particularly advantageous when the accumulation system 14 is "pancake"-shaped, i.e. has a large surface and a reduced thickness; indeed, in this case, the rigid busbars 17 are relatively long (even longer than one meter) and thus their weight is greater. The "pancake" shape of the storage system 14 is typical when the storage system 14 is rested on the floorpan of the passenger compartment, because in this case a large area and a thin thickness is available.

The invention claimed is:

1. A storage system for the storage of electric energy for a vehicle with electric propulsion, the storage system comprising:

a plurality of electrochemical batteries, which are divided into groups, each of which group comprises electrochemical batteries electrically connected to each other; and two rigid busbars, which electrically connect the groups of electrochemical batteries in parallel and present respective connection portion, which constitute connection terminals of the storage system;

wherein each rigid busbar presents a variable cross section, which increases in size towards the connection portion, so that the cross section of each rigid busbar is largest proximate to the connection portion and smallest at an end distal to the connection portion; and wherein each rigid busbar presents a stepped variable cross section, which increases in steps upstream and in proximity to a connection point of each group of electrochemical batteries.

2. The storage system according to claim 1, wherein the cross section of each rigid busbar increases in steps by a same quantity upstream and in proximity to the connection point of each group of electrochemical batteries.

3. The storage system according to claim 1, wherein the electrochemical batteries inside each group of electrochemical batteries are connected to each other in parallel.

4. The storage system according to claim 1, wherein the electrochemical batteries inside each group of electrochemical batteries are connected to each other in series.

5. The storage system according to claim 1, wherein the connection portion of each rigid busbar coincides with one end of the rigid busbar.

6. The storage system according to claim 1, wherein each cell is a part of a multi-cell battery.

7. The storage system according to claim 1, wherein the batteries of a group are interconnected in parallel.

8. The storage system according to claim 1, wherein the batteries of a group are interconnected in series.

9. The storage system according to claim 1, wherein each rigid busbar mechanically interconnects batteries of the plurality of batteries.

10. The storage system according to claim 9, wherein each rigid busbar presents a variable cross section, which increases in size close to the connection portion, so that the cross section of each rigid busbar is the largest in correspondence to the connection portion and the smallest in correspondence to the end which lies the farthest from the connection portion.

* * * * *